United States Patent [19]

Ryoke et al.

[11] Patent Number: 4,728,569

[45] Date of Patent: Mar. 1, 1988

[54] MAGNETIC RECORDING MEDIUM

[75] Inventors: Katsumi Ryoke; Nobutaka Yamaguchi; Masatoshi Takahashi; Kazuko Hanai; Hideaki Kosha; Eiichi Tadokoro, all of Kanagawa, Japan

[73] Assignee: Fuji Photo Film Co., Ltd., Kanagawa, Japan

[21] Appl. No.: 799,759

[22] Filed: Nov. 19, 1985

[30] Foreign Application Priority Data

Nov. 19, 1984 [JP] Japan ................. 59-242398

[51] Int. Cl.$^4$ ............................................ G11B 5/708
[52] U.S. Cl. .................................... 428/323; 427/131; 428/694; 428/695; 428/900
[58] Field of Search ............... 428/694, 323, 695, 900, 428/403, 408; 427/131; 300/131, 134, 135

[56] References Cited

U.S. PATENT DOCUMENTS

| 4,451,531 | 5/1984 | Isobe et al. | 428/694 |
| 4,544,601 | 10/1985 | Yamaguchi et al. | 428/403 |
| 4,578,311 | 3/1986 | Ishikuro et al. | 427/131 |

Primary Examiner—Paul J. Thibodeau
Attorney, Agent, or Firm—Sughrue, Mion, Zinn, Macpeak, & Seas

[57] ABSTRACT

A magnetic recording medium is described, comprising a magnetic layer coated on one side of a non-magnetic support and a backing layer coated on the opposite side of the non-magnetic support, wherein the backing layer is provided after the magnetic layer has been subjected to calendering treatment and the backing layer comprises (i) non-magnetic particles including carbon black particles having an average particle diameter of from 0.1 to 1 μm and (ii) a binder composition comprising from 50 to 95 wt % of a resin having a 100% modulus at 150 kg/cm$^2$ or less based on the total weight of the binder composition, and the weight ratio of non-magnetic particles to binder composition contained in the backing layer is from 300/100 to 40/100.

9 Claims, No Drawings

MAGNETIC RECORDING MEDIUM

FIELD OF THE INVENTION

The present invention relates to a magnetic recording medium, and more particularly it relates to a magnetic recording medium having a highly sensitized magnetic recording layer (hereinafter a "magnetic layer") and a backing layer on the opposite surface of a support in order to make the magnetic layer more sensitive.

BACKGROUND OF THE INVENTION

Recently, magnetic recording media have been required to be more sensitive. If magnetic recording medium is made more sensitive, a high quality image as well as a good sound quality and high density recording thereof can be realized. Those improvements can be attained by improving a magnetic recording and replaying system for a magnetic recording medium, and also improving a magnetic recording medium itself.

A magnetic recording medium can be more highly sensitized by increasing the signal and decreasing the noise, i.e., by increasing the signal/noise ratio itself. The signal can be increased by increasing the residual magnetic flux density and the coercive force of the magnetic recording medium, which can be realized by making ferromagnetic particles finer or adjusting the shape of anisotropy and arrangement of magnetic domains for each of the ferromagnetic fine particles.

The noise can be decreased by various factors, for example, by smoothing the magnetic layer and controlling the charging properties of the magnetic recording medium. It has been disclosed that a backing layer can be provided in order to control the charging properties of the magnetic recording medium and maintain the running durability thereof, for example, in Japanese Patent Publication Nos. 3927/75 and 23647/83, and Japanese Patent Application (OPI) Nos. 111828/82, 102004/77, and 96505/77 (the term "OPI" as used herein refers to a "published unexamined Japanese patent application").

However, a magnetic recording medium having high sensitivity and sufficient running durability cannot be obtained satisfactorily by the above technology, because: (1) although spacing loss between the magnetic recording and replaying head and the magnetic recording medium can be reduced by smoothing the surface of the magnetic recording medium, the running durability thereof deteriorates and the friction coefficient increases, whereby the magnetic recording layer and the backing layer tend to wear out more quickly; (2) if the surface of the backing layer is made rough in order to improve the running durability of the backing layer, the rough surface of the backing layer is printed through on the magnetic layer before calendering treatment is conducted, whereby the signal/noise ratio of the magnetic layer decreases; (3) even at an early stage of running when the magnetic layer and the backing layer are not yet worn out, dropouts increase, thereby decreasing the signal/noise ratio; and (4) although calendering treatment can be conducted, as disclosed, for example, in Japanese Patent Publication No. 10244/74, to smooth a magnetic layer and to realize a highly sensitive magnetic layer, highly smoothening a magnetic layer to make it more sensitive also renders the backing layer smooth, whereby the backing layer easily drops off as a powder, and it is difficult to manufacture a magnetic recording medium having such a highly smoothed magnetic layer.

SUMMARY OF THE INVENTION

Thus, objects of the present invention include providing a magnetic recording medium having reduced dropouts after repeated running, having a high S/N ratio, and having a backing layer having excellent durability.

The present inventors have made extensive investigations, and, as the result, have found that: (1) if calendering treatment is done on a backing layer, the S/N ratio increases and the backing layer is smoothed, and thus calendering treatment should not be done on a backing layer; (2) surface roughness of a backing layer should be maintained in such an extent that the S/N does not decrease; and (3) dust and contaminants are readily adhered on a backing layer if the backing layer is made mirror-like. Based on these findings, the inventors now accomplished the present invention.

The present invention provides a magnetic recording medium comprising a magnetic layer coated on one side of a non-magnetic support and a backing layer coated on the opposite side of the non-magnetic support, wherein the backing layer is provided after the magnetic layer has been subjected to calendering treatment and the backing layer comprises (i) non-magnetic particles including carbon black particles having an average particle diameter of from 0.1 to 1 $\mu$m and (ii) a binder composition comprising from 50 to 95 wt% of a resin having a 100% modulus at 150 kg/cm$^2$ or less based on the total weight of the binder composition, and the weight ratio of non-magnetic particles to binder composition contained in the backing layer is from 300/100 to 40/100.

DETAILED DESCRIPTION OF THE INVENTION

Ferromagnetic fine particles used for a magnetic layer in the present invention include $\gamma$-Fe$_2$O$_3$, Co-containing $\gamma$-Fe$_2$O$_3$, Fe$_3$O$_4$ Co-containing Fe$_3$O$_4$, CrO$_2$, Co-Ni-P alloy and Co-Ni-Fe alloy, having a specific surface area measured by the nitrogen absorption method (the B.E.T. method) of 25 m$^2$/g or more, and preferably 30 m$^2$/g or more. Specific examples of ferromagnetic fine particles are disclosed in Japanese Patent Publication Nos. 14090/69, 18372/70, 22062/72, 22513/72, 28466/71, 38755/71, 4286/72, 12422/72, 17284/72, 18509/72, and 18573/72.

Examples of ferromagnetic fine particles, binders and additives used for the magnetic layer, supports, and a method for preparing a magnetic recording medium are disclosed in Japanese Patent Publication No. 26890/81, and U.S. Pat. No. 4,135,016.

Carbon black used as the non-magnetic particles in the backing layer of the present invention includes MT (Medium Thermal), FT (Fine Thermal) and furnace carbon corresponding to MT or FT (which are classes defined in the trade of carbon black) having an average particle size of from 0.1 to 1 $\mu$m, preferably from 0.1 to 0.6 $\mu$m, and more preferably from 0.2 to 0.45 $\mu$m. Examples of commercially available carbon black that can be used include those under the trademarks of "Asahi Thermal" manufactured by Asahi Carbon Co., Ltd., "HTC #20" manufactured by Nittetsu Kagaku Co., Ltd., "Sevacarp MT" manufactured by Sevalco, "Huber N990" manufactured by Huber Co., LTd., "Raven MTP" manufactured by Columbian Co., Ltd., and "Thermax P-33", manufactured by Carbarb Co., Ltd. Features of these carbon black are that specific surface area measured by the nitrogen absorption method (the B.E.T. method) is generally 25 m$^2$/g or less, preferably from 1 to 20 m$^2$/g, more preferably from 5 to 15 m$^2$/g and that "structure" of carbon black does not comparatively develop (the term "structure" means structure formed by connection or aggregation of particles and is often used in the art of carbon black, cf. C. W. Sweitzer et al, *Rubber Age*, 55, 469 (1944) and The *Carbon Black Year Book*, p. 169, edit. by Carbon Black Society). Extremely strong dispersing power is necessary to blend carbon black and a binder and the structure of the carbon black is generally destroyed while such blend is proceeding. If they are not fully blended, the carbon black tends to drop off after a coating composition containing it is coated. However, carbon of MT and FT and that corresponding to MT or FT used in the present invention has less developed structure or no structure and is well blended with a binder, and surface electric resistance of the coated layer does not increase even if dispersion proceeds. Therefore, the carbon black of the present invention is capable of providing suitable surface roughness and contributes to provide good durability.

Fine particles other than carbon black that can also be included as the non-magnetic particles in the backing layer in the present invention are TiO, TiO$_2$, Tarc, BaSO$_4$, CaCO$_3$, graphite, carbon fluoride, boron nitride, SiO$_2$, MoS$_2$, ZnO, $\alpha$-Fe$_2$O$_3$, Al$_2$(SiO$_3$), Al$_2$O$_3$, CaSiO$_3$, zeolite, MgCO$_3$, BaCO$_3$, Cr$_2$O$_3$, SiC, silicon nitride, zirconium silicate, magnesium silicate, benzoguanamine resin, CsO, BeO, boron carbide, Mg(CH)$_2$, and the like. Among these particles, those that have low surface electric resistance and those having low surface electric resistance, of which high surface electric resistance is decreased by surface treatment are preferred. These particles having an average particle size (diameter) of from about 0.01 $\mu$m to 3 $\mu$m are preferred.

It is preferred that non-magnetic particles of the present invention contain afore-mentioned carbon black in an amount of 50 wt% or more based on the total weight of the non-magnetic particles.

Resins used as the binder component for the backing layer in the present invention include conventionally known thermoplastic resins, thermosetting resins, reactive type resins, and mixtures thereof.

Thermoplastic resins having a softening temperature of 150° C. or less, an average molecular weight of from 10,000 to 200,000, and a degree of polymerization of about from 200 to 2,000 are used, such as a copolymer of vinyl chloride and vinyl acetate, a polyurethane resin, a phenoxy resin, an epoxy resin, a polyester resin, a copolymer of acrylic acid ester and styrene, a copolymer of methacrylic acid ester and acrylonitrile, a copolymer of methacrylic acid ester and styrene, an urethane elastomer, a nylon-silicone type resin, a copolymer of butadiene and acrylonitrile, a polyamide resin, a polyvinyl butyral, cellulose derivatives (e.g., cellulose acetate butyrate, cellulose diacetate, cellulose triacetate, cellulose propionate and the like), a copolymer of styrene and butadiene, a copolymer of chlorovinyl ether and acrylic acid ester, an amino resin, thermoplastic resins of various synthetic rubber type, or a mixture thereof.

The resins used in the backing layer of the present invention have a 100% modulus at 150 kg/cm$^2$ or less (which is a tensile modulus at an elongation of 100% compared to the original length), as defined in accordance with JIS-K 6301 and are used in an amount of from 50 to 95 wt% based on the total amount of the binder composition. Typical examples of resins having a 100% modulus at 150 kg/cm$^2$ or less, preferably 100 kg/cm$^2$ or less, include DN-4805 (100% modulus: 50 kg/cm$^2$), DN-4806 (100 kg/cm$^2$), DN-4830 (120 kg/cm$^2$), N2302 (25 to 40 kg/cm$^2$), and N2304 (15 to 30 kg/cm$^2$), which are polyurethanes manufactured by Nippon Polyurethane Co., Ltd., and Pandex T-5102S (50 kg/cm$^2$) which is a polyurethane manufactured by Dainippon Ink and Chemicals, Inc.

In the present invention, the binder composition of the backing layer may include a hardening agent. Examples of hardening agent include polyisocyanate type hardening agents, such as "Desmodur L-75" manufactured by Bayer Co., Ltd., "Collonate 2014", "Collonate L", and "Collonate 3040" manufactured by Nippon Polyurethane Co., Ltd.

the resins having a 100% modulus at 150 kg/cm$^2$ or less are used in an amount of from 50 to 95 wt% so that scratches made by dust and contaminants between guide systems should be reduced, because the resins absorb impacts of dust and contaminants. Polyisocyanate, which is fast to cure and harden itself, is effective in giving a backing layer having good toughness. Therefore, it is preferred that polyisocyanate is used in an amount of from 5 to 40 wt% based on the total amount of the binder composition.

The binder composition for the backing layer may also include other resins in an amount of less than 50 wt%, such as conventional thermoplastic resins, thermosetting resins, reactive type resins, and a mixture thereof.

The resins having a softening temperature of 150° C. or less, an average molecular weight of from 10,000 to 200,000 and a degree of polymerization of about from 200 to 2,000 are used, such as a copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, an urethane elastomer, a nylon-silicone type resin, a nitrocellulose-polyamide resin, a polyvinyl fluoride, a copolymer of vinylidene chloride and acrylonitrile, a copolymer of butadiene and acrylonitrile, a polyamide resin, polyvinyl butyral, cellulose derivatives (e.g., cellulose acetate butyrate, cellulose diacetate, cellulose triacetate, cellulose propionate, nitrocellulose and the like), a copolymer of styrene and butadiene, a polyester resin, a copolymer of chlorovinyl ether and acrylic acid ester, an amino resin, a phenoxy resin, thermoplastic resins of various synthetic rubber type, and the mixture thereof.

Examples of these resins are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/72.

The weight ratio of non-magnetic particles to the total binder composition contained in the backing layer is from 300/100 to 40/100, and preferably from 200/100 to 50/100. When the weight ratio of non-magnetic particles and binder composition exceeds 300/100, adhesion between the backing layer and the non-magnetic support deteriorates and dropouts readily increase after repeated running. When the weight ratio thereof is under 40/100, surface electric resistance of the tape is not satisfactory, and noise generated by charge occurring between the tape and a deck head is observed as dropouts.

Various dispersing agents and lubricating agents known in the art can be added to the backing layer of the present invention.

The dispersing agents in the backing layer of the present invention include a fatty acid having from 12 to 18 carbon atoms ($R_1COOH$, wherein $R_1$ is an alkyl group having from 11 to 17 carbon atoms) such as caprylic acid, capric acid, lauric acid, myristic acid, palmitic acid, stearic acid, oleic acid, elaidic acid, linoleic acid, linolic acid, or stearol acid; a metal soap comprised of an alkali metal (e.g., Li, Na, K, etc.) of the above fatty acid or of an alkaline earth metal (e.g., Mg, Ca, Ba, etc.), Pb, Cu and the like of the above fatty acid; lecithin; etc.

The lubricating agents used in the backing layer of the present invention include graphite, molybdenum disulfide, tungsten disulfide, a fatty acid ester comprised of a monobasic fatty acid having from 12 to 16 carbon atoms and monohydric alcohol having from 3 to 12 carbon atoms, a fatty acid ester comprised of monobasic fatty acid having 17 or more of carbon atoms and a monohydric alcohol where the fatty acid ester has the total carbon atoms of from 21 to 23, and silicones such as dimethyl polysiloxane, methyl phenyl siloxane and the like.

Classification between dispersing agents and lubricating agents is somewhat unclear, and there are many compounds which have characteristics both as a dispersing agent and as a lubricating agent.

Organic solvents used for mixing and kneading and coating the composition for the backing layer in the present invention include ketones such as acetone, methyl ethyl ketone, methyl isobutyl ketone or cyclohexanone; alcohols such as methanol, ethanol, propanol, or butanol; esters such as methyl acetate, ethyl acetate, butyl acetate, ethyl lactate, or glycol acetate; glycol ethers such as ether, glycol dimethyl ether, glycol monoethyl ether or dioxane; tars (aromatic hydrocarbons) such as benzene, toluene or xylene; and chlorinated hydrocarbon such as methylene chloride, ethylene chloride, carbon tetrachloride, chloroform, ethylene chlorohydrin or dichlorobenzene, and water, in optional proportions.

Both the magnetic recording layer and the backing layer are formed by dispersing appropriate compositions as described above in a suitable combination to prepare a coating composition in an organic solvent, and coating it on a support.

When a magnetic recording medium is used as a tape, the thickness of the support is generally from about 2.5 to 100 $\mu$m, and preferably from 3 to 40 $\mu$m. Materials for the support include polyesters such as polyethylene terephthalate or polyethylene naphthalate; polyolefins such as polypropylene; cellulose derivatives such as cellulose triacetate or cellulose diacetate; vinyl type resins such as polyvinyl chloride; plastics such as polycarbonate; metals such as aluminum or copper; and ceramics such as glass.

Various mixing and kneading devices are used for mixing and dispersing the above coating composition such as a ball mill, a pebble mill, a sand grinder, an attritor, a three-roll mill, a high speed impellor dispersing device, a high speed stone mill.

The method for coating the backing layer on the support includes an air doctor coating method, a blade coating method, an air knife coating method, a squeeze coating method, a dip coating method, a reverse roll coating method, a transfer roll coating method, a gravure coating method, a kiss coating method, a cast coating method, a spray coating method, overcoating method and the like. These coating methods are disclosed in more detail in *Coating Kogaku* (Coating Engineering), pages 253 to 277, published by Asakura Shoten, Japan (Mar. 20, 1971).

The thickness of the backing layer is preferably from 1.5 $\mu$m to 2.5 $\mu$m after coating (i.e., dry thickness).

After coating, the above-described magnetic layer is subjected to magnetic orientation, dried, and then subjected to calendering treatment to smooth a surface thereof in a conventional manner. It is generally common for preparing a magnetic recording medium that a support having a magnetic layer and a backing layer provided on the surface thereof is subjected to calendering treatment. However, in the present invention, after a backing layer having the above-described composition is provided, it is not subjected to calendering treatment. That is, after a magnetic layer is provided on a support, it is subjected to magnetic orientation, dried and subjected to calendering treatment, and then the aforementioned backing layer is provided on the opposite side of the support.

Generally, when a backing layer undergoes calendering treatment, the surface roughness thereof decreases, and the surface of the backing layer is made smooth and glossy. Therefore, friction between a surface of the backing layer and the tape running path increases, whereby parts of the backing layer easily drops off as powder, causing dropouts. On the contrary, in the present invention, by giving calendering treatment to the magnetic layer, but not to the backing layer, a magnetic recording medium having both high sensitivity and good running properties can be obtained.

The present invention is further illustrated in more detail by the following Examples, but the present invention is not limited thereto. In the Examples, all parts are by weight.

EXAMPLE 1

The following composition was introduced into a ball mill, then mixed and kneaded sufficiently. Thereafter, 25 parts of "Desmodur L-75" (trademark of a polyisocyanate compound manufactured by Bayer Co.) was added thereto, and they were mixed, kneaded, and dispersed homogeneously to obtain a magnetic coating composition.

| | |
|---|---|
| Co-containing $\gamma$-$Fe_2O_3$ particles (Specific surface area measured by nitrogen absorption method: 30 $m^2$/g, Hc = 650 Oe) | 300 parts |
| Vinyl chloride-vinyl acetate copolymer ("VMCH", trademark for product manufactured by Union Carbide Co., Ltd.) | 40 parts |
| Nitrocellulose | 10 parts |
| "Nipporan N2304", trademark for product manufactured by Nippon Polyurethane Co., Ltd.) | 25 parts |
| Carbon black (Average particle size: 17 m$\mu$) | 20 parts |

-continued

| | |
|---|---|
| Graphite (Specific surface area measured by nitrogen absorption method: 300 m²/g) | 5 parts |
| Lecithin | 1 part |
| Oleic acid | 1.5 parts |
| Octyl laurate | 1.5 parts |
| Lauric acid | 1.5 parts |
| Butyl acetate | 333 parts |
| Methyl ethyl ketone | 666 parts |

The above coating composition was coated on a polyethylene terephthalate support, dried, and subjected to a calendering treatment.

The following composition for a backing layer was mixed and kneaded in a ball mill, and thereafter 10 parts of "Desmodur L-75" (a trademark of a polyisocyanate compound manufactured by Bayer Co., Ltd.; binder component) was added thereto, and they were mixed and dispersed homogeneously and were coated on the opposite surface of the polyester support to the magnetic layer, in a dry thickness of 2.0 μm and dried.

| | |
|---|---|
| Carbon black ("Raven MTP", a trademark, average particle size: 250 mμ) | 100 parts |
| Polyurethane resin (binder component) (Pandex T-5102S", a trademark for product manufactured by Dainippon Ink and Chemicals, Inc., 100% modulus: 50 kg/cm²) | 20 parts |
| Phenoxy resin (binder component) ("PKHH", a trademark for product manufactured by Union Carbide Co., 100% modulus: 600 kg/cm²) | 10 parts |
| Methyl ethyl ketone | 660 parts |
| Cyclohexanone | 330 parts |

The resulting tape was slit to a width of 1 inch to obtain Sample No. 1.

COMPARATIVE EXAMPLE 1

The same procedure as that in Example 1 was repeated, except that calendering treatment was conducted after the coating composition for the backing layer was coated to prepare Sample No. 2.

COMPARATIVE EXAMPLE 2

The same procedure as that in Example 1 was repeated to prepare Sample No. 3, except that carbon "Asahi #50" (94 mμ) was used instead of carbon black in Example 1 in the coating composition for the backing layer.

COMPARATIVE EXAMPLE 3

The same procedure as that in Example 1 was repeated to obtain Sample No. 4, except that nitrocellulose (nitration degree: 11.11%; molecular weight: 10,000; see below*) was used instead of "Pandex T-5102S" in the composition for the backing layer in Example 1.

(*: It was broken before the elongation reached at 100%.)

COMPARATIVE EXAMPLE 4

The same procedure as that in Example 1 was repeated to obtain Sample No. 5, except that 160 parts of carbon black was used in the composition for the backing layer in Example 1.

EXAMPLE 2

The same procedure as that in Example 1 was repeated to obtain Sample No. 6, except that 20 parts of carbon black was used in the composition for the backing layer in Example 1.

COMPARATIVE EXAMPLE 5

The same procedure as in Example 1 was repeated to obtain Sample No. 7, except that 12 parts of carbon black was used in the composition for the backing layer in Example 1.

Regarding these tapes, audio S/N, scratching on the backing layer and a number of dropouts were measured. The results are shown in Table below.

Tests and evaluation were made in the following manner.

Audio S/N is indicated in terms of the difference between the replayed output level of a signal of 1 KHz recorded at a predetermined input level and the replayed output level after passing an audio correction circuit at a non-signal stage (blank portion), and is shown as a relative value so that S/N of Sample No. 1 is 0 dB.

Scratches on the backing layer which had repeated play-rewind for 100 passes on a tape deck was measured and evaluated based on the following three grades.

A: No scratch
B: 1 to 5 scratches
C: 6 or more scratches.

The number of dropouts after repeated use for 1000 passes was also shown. The dropouts value is identified in terms of the number of occurrences of dropouts for 5 μsec or more per 1 min., measured by a dropout counter, where the replayed output level was decreased by 16 dB or more.

TABLE

| Sample No. | Calendering of backing layer | Carbon black | Resin*1 | P/B*2 | Audio S/N | Scratches on backing layer | Number of dropouts |
|---|---|---|---|---|---|---|---|
| 1*3 | not done | 250 mμ | presence | 250/100 | 0 dB | A | 15 |
| 2 | done | " | " | " | −0.7 dB | B | 62 |
| 3 | not done | 94 mμ | " | " | −1.1 dB | B | 38 |
| 4 | " | 250 mμ | absence | " | +0.2 dB | A | 240 |
| 5 | " | " | presence | 400/100 | +0.1 dB | B | 87 |
| 6*3 | " | " | " | 50/100 | 0 dB | A | 10 |
| 7 | " | " | " | 30/100 | −0.4 dB | C | 260 |

Notes:
*1Resin having a 100% modulus at 150 kg/cm² or less
*2Weight ratio of non-magnetic particles to binder composition
*3Sample Nos. 1 and 6 are examples of the present invention and the other samples are comparative examples.

It is clear from the above results that in the present invention, the audio S/N and dropouts levels are excellent, and no scratches were formed on the backing layer during the running test.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer coated on one side of a non-magnetic support and a backing layer coated on the opposite side of the non-magnetic support, wherein the backing layer is provided after the magnetic layer has been subjected to calendering treatment and the backing layer comprises (i) non-magnetic particles including carbon black particles having an average particle diameter of from 0.1 to 1 μm and (ii) a binder composition comprising from 50 to 95 wt% of a resin having a 100% modulus at 150 kg/cm$^2$ or less based on the total weight of the binder composition, and the weight ratio of non-magnetic particles to binder composition contained in the backing layer is from 300/100 to 40/100.

2. A magnetic recording medium as in claim 1, wherein the carbon black particles comprise 50 wt% or more of the total weight of the non-magnetic particles.

3. A magnetic recording medium as in claim 2, wherein the average particle diameter of non-magnetic particles other than carbon black particles is from 0.01 μm to 3 μm.

4. A magnetic recording medium as in claim 1, wherein the binder composition includes from 5 to 40 wt% of polyisocyanate based on the total weight of the binder composition.

5. A magnetic recording medium as in claim 1, wherein the carbon black has a particle size of 0.2 μm or more.

6. A magnetic recording medium as in claim 1, wherein the carbon black has a particle size of 0.2 μm to 0.45 μm.

7. A magnetic recording medium as in claim 1, wherein the resin having a 100% modulus at 150 kg/cm$^2$ has a softening temperature of 150° C. or less, an average molecular weight of from 10,000 to 200,000 and a degree of polymerization of about from 200 to 2,000, and is selected from the group consisting of a copolymer of vinyl chloride and vinyl acetate, a copolymer of vinyl chloride and vinylidene chloride, a copolymer of vinyl chloride and acrylonitrile, a copolymer of an acrylic acid ester and acrylonitrile, a copolymer of an acrylic acid ester and vinylidene chloride, a copolymer of an acrylic acid ester and styrene, a copolymer of a methacrylic acid ester and acrylonitrile, a copolymer of a methacrylic acid ester and vinylidene chloride, a copolymer of a methacrylic acid ester and styrene, an urethane elastomer, a nylon-silicone resin, a nitrocellulose-polyamide resin, a polyvinyl fluoride, a copolymer of vinylidene chloride and acrylonitrile, a copolymer of butadiene and acrylonitrile, a polyamide resin, a polyvinyl butyral, a cellulose derivative, a copolymer of styrene and butadiene, a polyester resin, a copolymer of chlorovinyl ether and an acrylic acid ester, an amino resin, a phenoxy resin, a thermoplastic synthetic rubber, and a mixture thereof.

8. A magnetic recording medium as claimed in claim 1, wherein the resin having a 100% modulus at 150 kg/cm$^2$ or less is a polyurethane.

9. A magnetic recording medium as claimed in claim 1, wherein the backing layer is not calendered.

* * * * *